(12) United States Patent　　(10) Patent No.:　　US 9,157,823 B2
Huang et al.　　(45) Date of Patent:　　*Oct. 13, 2015

(54) PRESSURE GAUGE AND METHOD OF MEASURING PRESSURE

(75) Inventors: Chung-Chin Huang, Taichung (TW);
Chin-Ying Huang, Taichung (TW);
Hsin-Ming Huang, Taichung (TW);
Hsing-Hsiung Huang, Taichung (TW);
Kuan-Chou Lin, Taichung (TW);
Yen-Jen Yen, Yunlin (TW);
Chiang-Wen Lai, Taichung (TW)

(73) Assignee: GRAND MATE CO., LTD., Taichung (TW)

( * ) Notice: Subject to any disclaimer, the term of this patent is extended or adjusted under 35 U.S.C. 154(b) by 905 days.

This patent is subject to a terminal disclaimer.

(21) Appl. No.: 13/233,431

(22) Filed: Sep. 15, 2011

(65) Prior Publication Data

US 2013/0073225 A1　　Mar. 21, 2013

(51) Int. Cl.
*G01L 7/00*　　(2006.01)
*G01L 9/14*　　(2006.01)

(52) U.S. Cl.
CPC ........................................ *G01L 9/14* (2013.01)

(58) Field of Classification Search
CPC .............. G01L 1/12; G01L 9/14; G01L 9/16; G01F 1/74; G01N 9/002; G05D 7/0635
See application file for complete search history.

(56) References Cited

U.S. PATENT DOCUMENTS

| 3,229,524 | A  | * | 1/1966 | Jewell .............................. 73/753 |
| 8,356,623 | B2 | * | 1/2013 | Isobe et al. .................... 137/486 |
| 2013/0061690 | A1 | * | 3/2013 | Huang et al. ............... 73/862.69 |

* cited by examiner

*Primary Examiner* — Elias Desta
(74) *Attorney, Agent, or Firm* — Tracy M. Heims; Apex Juris, Pllc

(57) ABSTRACT

The present invention provides a pressure gauge for measuring a pressure of a source. The pressure gauge includes a case, a flexible film, a magnetic device, a coil, a processor, and a screen. The case has a bore connecting the source. The coil is provided in the case. The flexible film is provided on an inner side of the case to cover the bore that the flexible film is expandable by the pressure of the source. The magnetic device is received in the case to be moved relative to the coil by the flexible film. The movement of the magnetic device causes the coil to generate an induced electromotive force, and the processor may find the gas pressure according to the induced electromotive force, and show it on the screen.

7 Claims, 5 Drawing Sheets

The pressure of the source moves the magnetic device relative to the coil

The coil generates an induced electromotive force because of the variable magnetic field The processor calculates the pressure according to the induced electromotive fore force and shows it on the screen

PRESSURE GAUGE AND METHOD OF MEASURING PRESSURE

BACKGROUND OF THE INVENTION

1. Field of the Invention

The present invention relates generally to a sensor, and more particularly to a pressure gauge and a method of measuring pressure.

2. Description of the Related Art

There are many pressure gauges, such as U-tube gauge and Bourdon-tube gauge, to measure tire pressure, atmospheric pressure, and water pressure etc.

The U-tube gauge provides water or mercury in a U-shaped tube. The surfaces of the mercury will be at the same level when the pressures on the opposite ends of the U-shaped tube are the same, and there will be a height difference between the mercury surfaces when the pressures are different. One may find the pressure according to the height difference.

FIG. 1 shows a Bourdon-tube gauge 3, having a copper alloy tube 90, which has an elliptical cross section and is bent into a curved shape. An end of the tube 90 is connected to a connector 92. The distal end of the tube 90 is closed, and there is a space for the tube 90 to expand. When a pressure is transmitted to the tube 90 through the connector 92, the curved tube 90 will be extended. A link 94 connects the distal end of the tube 90 and a sector gear 96. The sector gear 96 is provided with a pointer 98 on a scale to show the value of pressure. In other words, the pressure may deform the tube 90 to move the pointer 96 through the link 94, and the pressure is directly proportional to the deformation of the tube 90 that the movement of the pointer 98 may indicate the pressure.

There are several drawbacks in the conventional pressure gauges, for example, the U-tube gauge has a poor precision in measurement, and the U-shaped tube usually is made of class which is easy to be broken. Besides, the temperature in the U-shaped tube will affect the precision of measurement. For the Bourdon-tube gauge the temperature affects the precision of measurement also, and the material fatigue of the copper tube is another big problem.

To improve the conventional pressure gauges, a piezoelectric pressure gauge is provided. The piezoelectric pressure gauge has a piezoelectric material therein. The piezoelectric material may results electricity from pressure that the piezoelectric pressure gauge may precisely detect pressure.

Temperature has less affection on the piezoelectric pressure gauge, and the piezoelectric pressure gauge may provide a precise measurement. However, the piezoelectric material is exposed under the pressure directly that rusting, moisture and other facts may damage the piezoelectric material. Because the piezoelectric material generates electricity that the piezoelectric pressure gauge cannot be used to sense inflammable gas. In conclusion, there still are some places in the art of pressure measurement that needs to be improved.

SUMMARY OF THE INVENTION

The primary objective of the present invention is to provide a pressure gauge and a method of measuring pressure, which may provide a precise measurement and may be applied in all fields.

According to the objective of the present invention, the present invention provides a method of measure a pressure of a source includes the following steps:

A. Move a magnetic device by the pressure of the source;

B. Generate an induced electromotive force in a coil by a movement of the magnetic device; and C Convert the induced electromotive force into a pressure value which indicates the pressure of the source.

The present invention further provides a pressure gauge for measuring a pressure of a source, including a case having a bore connecting the source; a coil, which is made of a conductor, provided in the case; a flexible film provided on an inner side of the case to cover the bore that the flexible film is expandable by the pressure of the source; and a magnetic device received in the case to be moved relative to the coil by the flexible film.

The pressure of the source expands the flexible film to move the magnetic device relative to the coil that the coil generates an induced electromotive force directly proportional to the pressure of the source.

The present invention further provides a pressure gauge for measuring a pressure of a source, including a case having a bore connecting the source; a coil, which is made of a conductor, provided in the case; and a magnetic device received in the bore of the case to be moved relative to the coil by the pressure of the source directly.

The pressure of the source moves the magnetic device relative to the coil that the coil generates an induced electromotive force directly proportional to the pressure of the source.

In an embodiment, the pressure gauge further includes a processor electrically connected to the coil to convert the induced electromotive force into a pressure value to indicate the pressure of the source.

DETAILED DESCRIPTION OF THE INVENTION

Figure 1:
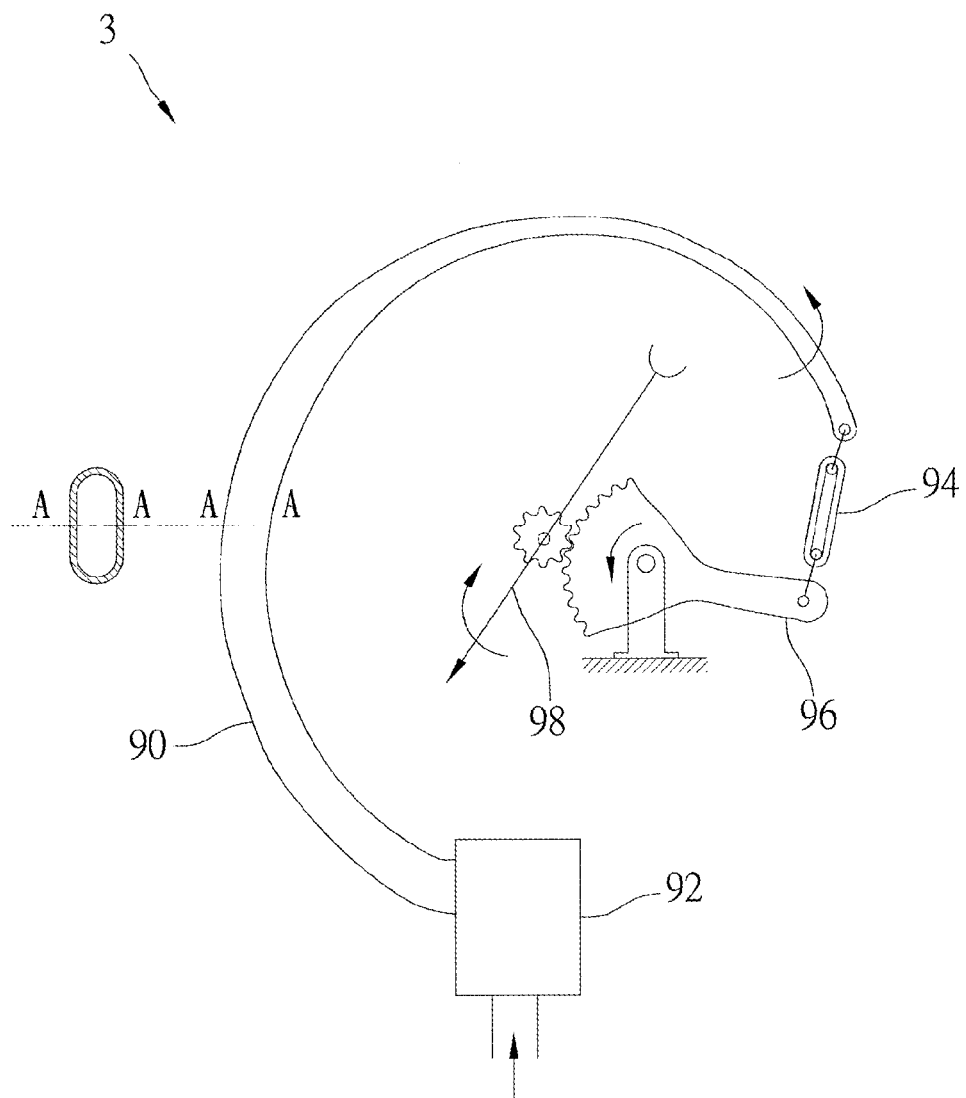
FIG. 1 is a sketch diagram of the Bourdon-tube gauge.
Figure 2:
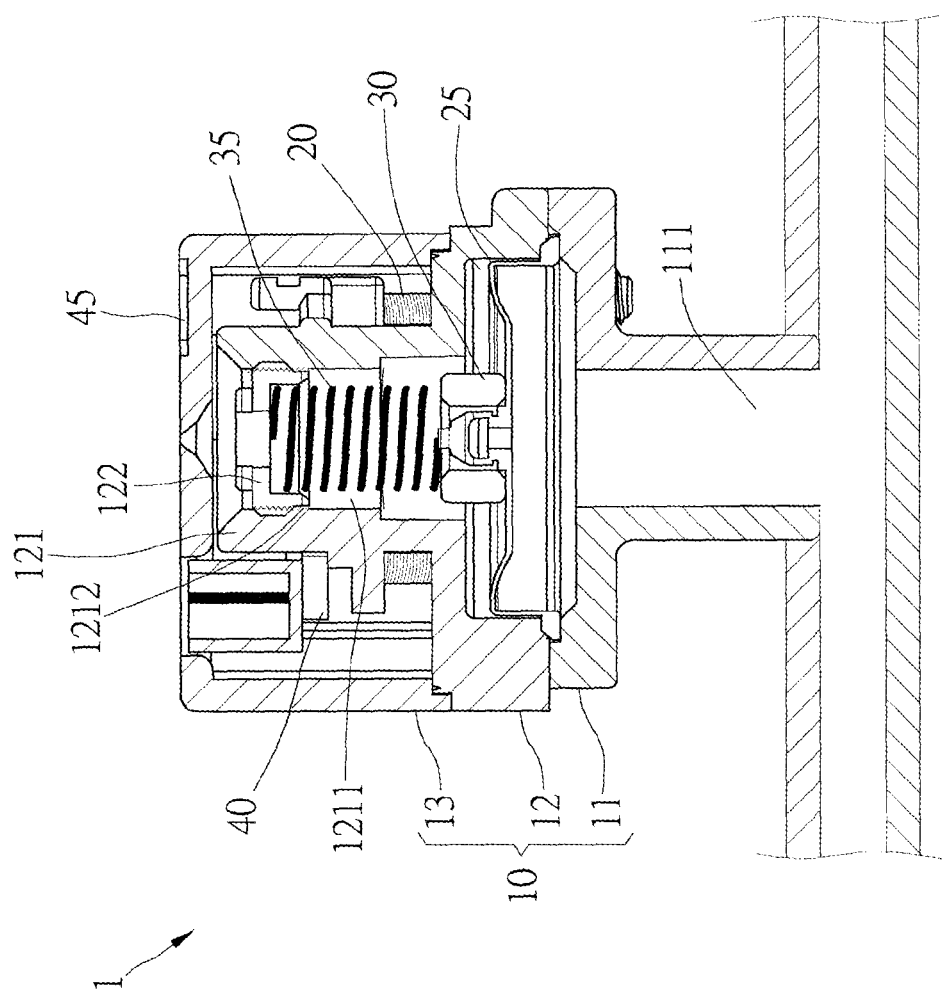
FIG. 2 is a sectional view of a first preferred embodiment of the present invention.

FIG. 2 shows a pressure gauge 1 of the first preferred embodiment of the present invention for measuring pressure of a source. The first embodiment is applied in measuring the pressure in a gas pipe 100, and, however, it may be applied in any other fields. The pressure gauge 1 includes a case 10, a coil 20, a flexible film 25, a magnetic device 30, a spring 35, a processor 40, and a screen 45.

The case 10 has a base 11, a lid 12, and a shield 13. The base 11 has a bore 111 to connect the gas pipe 100 that gas in the gas pipe 100 may enter the case 10 via the bore 111. The lid 12 engages the base 10 which has a main member 121 and a knob 122. The main member 121 has a chamber 1211 therein and a threaded hole 1212. The knob 122 engages the threaded hole 1212. The shield 13 engages the lid 12.

The coil 20 is made of a conductor, such as copper, iron, and silver. The coil 20 is received in the chamber 1211 of the lid 12 and surrounds the main member 121.

The flexible film 25 is provided on an inner side of the base 11 to cover the bore 111 that the flexible film 25 may be expanded by the gas.

The magnetic device 30 is received in the chamber 1211 and is able to be moved relative to the coil 20. The magnetic device 30 may be moved by the flexible film 25. In the present invention, the magnetic device 30 is a permanent magnet, and, however, it may be an electromagnet or other members with magnetism.

The spring 35 is received in the chamber 1211 with opposite ends urging the knob 122 and the magnetic device 30 that the magnetic device 30 is adjustable by turning the knob 122.

The processor 40 is provided in the case 10 between the lid 12 and the shield 13 and is electrically connected to the coil 20.

The screen 45 is provided on an outer side of the shield 13 and is electrically connected to the processor 40.

Figure 3:
FIG. 3 is a flow chart of measuring pressure of the present invention.
Figure 3:
Figure 4:
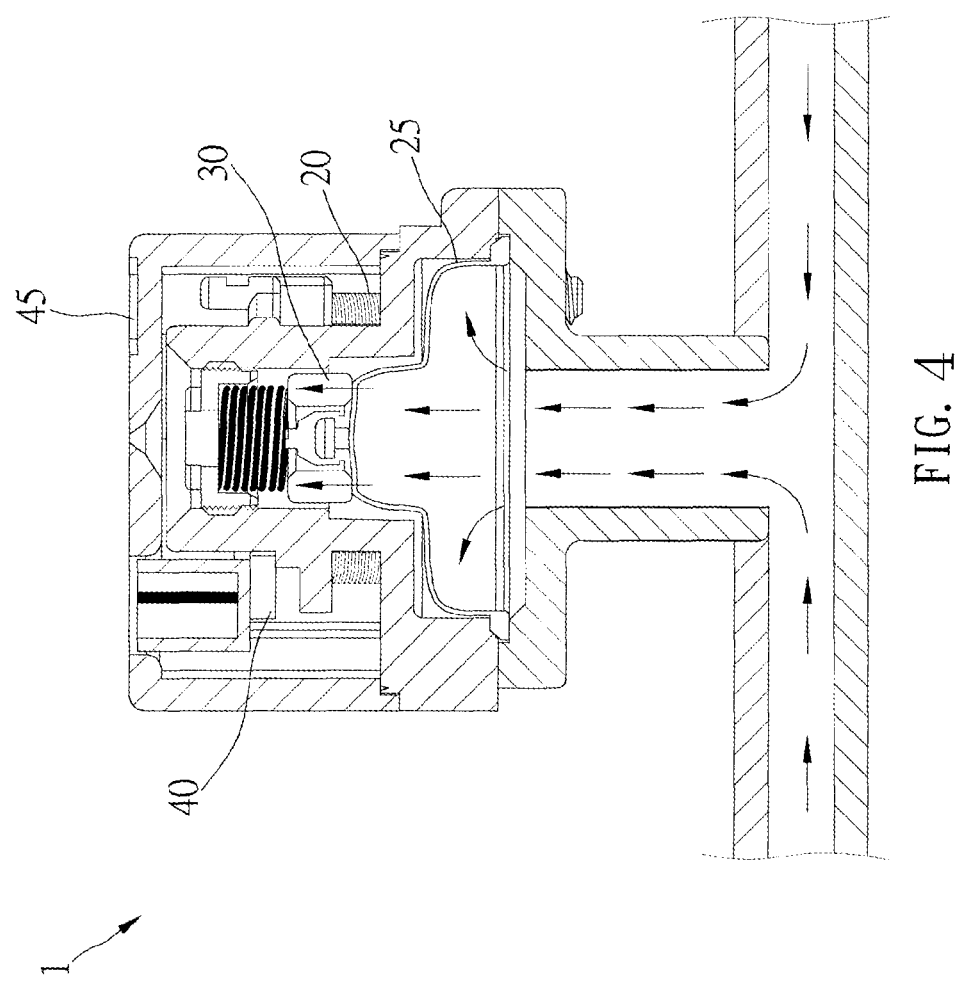
FIG. 4 is a sectional view of the first preferred embodiment of the present invention, showing the pressure gauge being measuring pressure.

As shown in FIG. 3, a method of measuring pressure by the pressure gauge 1 of the first preferred embodiment includes the following steps:

A. The gas enters the bore 111 to expand the flexible film 25 that the flexible film 25 may move the magnetic device 30 relative to the coil 20, as shown in FIG. 4. A distance of the movement of the magnetic device 30 is directly proportional to the pressure.

B. The magnetic device 30 provides a variable magnetic field to the coil 20 that the coil 20 generates an induced electromotive force because of the variable magnetic field. The same as above the induced electromotive force is directly proportional to the variable magnetic field.

C. The processor 40 receives the induced electromotive force to find the pressure in the flexible film 25 according to the induced electromotive force. It is known that the induced electromotive force is directly proportional to the variable magnetic field, and the variable magnetic field is directly proportional to the velocity of the magnetic device 30, and the velocity of the magnetic device 30 is directly proportional to the rate of expansion of the flexible film 25, and the rate of expansion of the flexible film 25 is directly proportional to the pressure of the gas. As a result, the processor 40 may find the gas pressure according to the induced electromotive force and show it on the screen 45.

The pressure gauge 1 of the present invention provides electromagnetic induction in measurement of the pressure that even a slight difference of pressure still may be detected by the pressure gauge 1 of the present invention to provide a precise measurement.

The flexible film 25 serves the first step of measuring pressure, except that the flexible film 25 may isolate the gas from the coil 20, the processor 40, and the screen 45 so that these electric and electronic devices may not be damaged. Therefore, the pressure gauge 1 of the present invention may measure the pressure of gas, liquid, inflammable gas/liquid or any other pressure sources in all fields.

Figure 5:
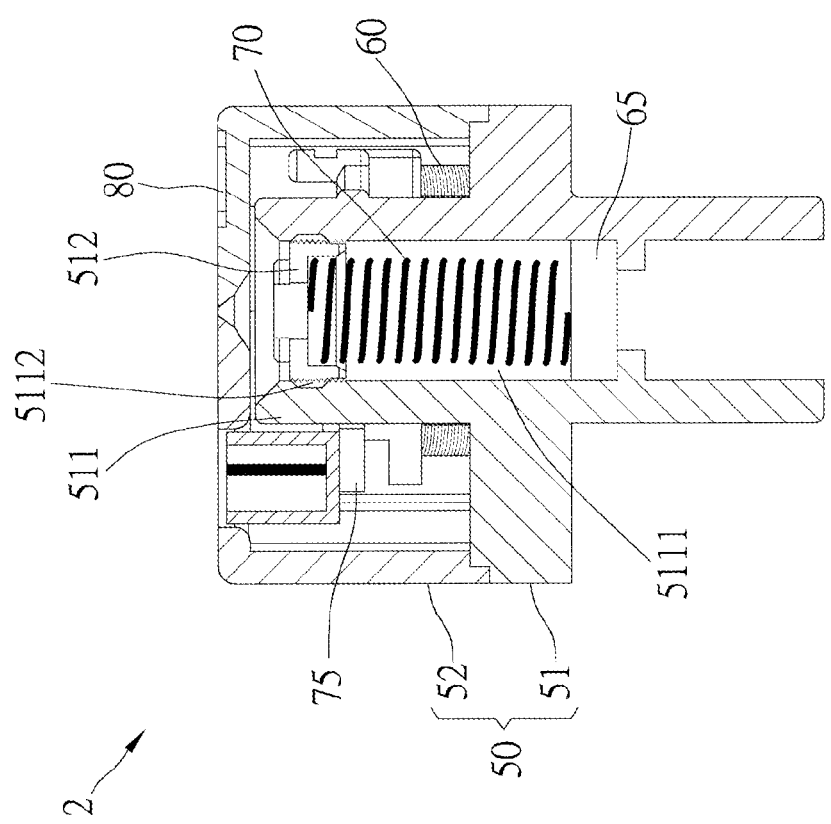
FIG. 5 is a sectional view of a second preferred embodiment of the present invention.

FIG. 5 shows a pressure gauge 2 of the second preferred embodiment of the present invention which includes a case 50, a coil 60, a magnetic device 65, a spring 70, a processor 75, and a screen 80.

The case 50 has a base 51 and a shield 52. The base 51 has a main member 511 and a knob 512. The main member 511 has a bore 5111 to engage the gas pipe and a thread hole 5112 communicated with the bore 5111. The knob 512 engages the threaded hole 51112. The shield 52 engages the base 51.

The coil 60 is provided in the main member 511 of the case 51 and surrounds the bore 5111.

The spring 65 is received in the bore 5111 and is movable relative to the coil 60.

The spring 70 is received in the bore 5111 with opposite ends urging the knob 512 and the magnetic device 65 that the magnetic device 65 is adjustable by turning the knob 512.

The processor 75 is provided in the case 50 between the base 51 and the shield 52, and is electrically connected to the coil 60.

The screen 80 is provided on an outer side of the shield 52 and is electrically connected to the processor 75.

Therefore, the gas in the gas pipe may move the magnetic device 65 in the bore 5111 relative to the coil 60 that the coil may generate an induced electromotive force, and the processor 75 may calculate the gas pressure according to the induced electromotive force and show it on the screen 80.

The pressure gauge 2 of the second preferred embodiment provides the magnetic device 65 to isolate the gas from the electric/electronic devices in the case 50 that the pressure gauge 2 of the second preferred embodiment serves the same function as the first embodiment without the flexible film.

The description above is a few preferred embodiments of the present invention and the equivalence of the present invention is still in the scope of claim construction of the present invention.

What is claimed is:

1. A pressure gauge for measuring a pressure of a source, comprising:
   a case having a bore connecting the source;
   a coil, which is made of a conductor, provided in the case;
   a flexible film provided on an inner side of the case to cover the bore that the flexible film is expandable by the pressure of the source; and
   a magnetic device received in the case to be moved by the flexible film;
   wherein the pressure of the source expands the flexible film to move the magnetic device relative to the coil that the coil generates an induced electromotive force directly proportional to the pressure of the source;
   a processor electrically connected to the coil to receive the induced electromotive force and thereby calculate the pressure of the source according to the induced electromotive force; and
   a screen electrically connected to the processor to show the pressure.

2. The pressure gauge as defined in claim 1, further comprising a spring with opposite ends urging the case and the magnetic device, wherein the spring is compressed when the flexible film moves the magnetic device.

3. The pressure gauge as defined in claim 2, wherein the case includes a base and a lid engaging the base, and the base has the bore, and the lid has a chamber therein to receive the magnetic device and the spring therein.

4. The pressure gauge as defined in claim 3, wherein the lid has a main member with the chamber therein and a threaded hole communicated with the chamber, and a knob engaging the threaded hole to contact the spring that the magnetic device is adjustable by turning the knob.

5. A pressure gauge for measuring a pressure of a source, comprising:
   a case having a bore connecting the source; a coil, which is made of a conductor, provided in the case; and a magnetic device received in the bore of the case to be moved by the pressure of the source directly;
   wherein the pressure of the source moves the magnetic device relative to the coil that the coil generates an induced electromotive force directly proportional to the pressure of the source;
   a processor electrically connected to the coil to receive the induced electromotive force and calculate the pressure of the source according to the induced electromotive force; and a screen electrically connected to the processor to show the pressure.

6. The pressure gauge as defined in claim 5, further comprising a spring with opposite ends urging the case and the magnetic device, wherein the spring is compressed when the magnetic device is moved.

7. The pressure gauge as defined in claim 6, wherein the case further includes a knob engaging a threaded hole on the case to contact the spring that the magnetic device is adjustable by turning the knob.

\* \* \* \* \*